UNITED STATES PATENT OFFICE.

LEVI STOCKBRIDGE, OF AMHERST, MASSACHUSETTS.

IMPROVEMENT IN PROCESSES OF MANUFACTURING FERTILIZERS.

Specification forming part of Letters Patent No. 172,590, dated January 25, 1876; application filed November 27, 1875.

*To all whom it may concern:*

Be it known that I, LEVI STOCKBRIDGE, of the town of Amherst, in the county of Hampshire and State of Massachusetts, have invented an Improvement in Manufacturing Food for Plants, by compounding certain chemical elements of plant-nutrition, to be hereinafter named, based in quantitative proportions on the content of such elements, in all the parts of root, stem, leaf, and fruit of healthy, perfectly mature plants, and which they cannot obtain from the soil or air in the right proportion or in sufficient quantity.

To apply the foregoing principle I have invented certain compounds, based on what I have ascertained to be the natural proportion in which the several parts of all cultivated plants enter into the mass weight, air-dried, of such plants, said compounds being composed of nitrogen, potash, and phosphoric acid, and of these elements, together with lime and magnesia for the cotton and tobacco plant, and to be applied in such quantities as to produce any required amount of crop on any specified area up to the point where the capacity of soil, air, and sunlight are equally balanced.

In illustration of my invention in compounding the elements named agreeably to the principle above stated, I give the following formulas, viz:

To produce fifty bushels of Indian corn per acre more than the natural yield of the land, and its proportion of root, stalk, and leaf, I use the following, viz: Nitrogen, sixty-four pounds; potash, seventy-seven pounds; phosphoric acid, thirty-one pounds—in form of sulphate ammonia, twenty-four per cent., three hundred and twenty pounds; muriate potash, eighty per cent., one hundred and fifty-four pounds; superphosphate, thirteen per cent. sol. acid, two hundred and forty-eight pounds.

To produce twenty-five bushels of wheat per acre, and its natural proportion of roots and straw, more than the natural yield of the land, I use: Nitrogen, forty-one pounds; potash, twenty-four pounds; phosphoric acid, twenty pounds—in the form of sulphate of ammonia, twenty-four per cent., two hundred and five pounds; muriate potash, eighty per cent., forty-eight pounds; superphosphate, thirteen per cent. sol. acid, one hundred and sixty pounds.

To produce twenty bushels of rye per acre more than the natural yield of the land, and its natural proportion of roots and straw, I use: Nitrogen, twenty-five pounds; potash, twenty-four pounds; phosphoric acid, sixteen pounds—in the form of sulphate ammonia, twenty-four per cent., one hundred and twenty-five pounds; muriate potash, eighty per cent., forty-eight pounds; superphosphate, thirteen per cent. sol. acid, one hundred and twenty-eight pounds.

To produce twenty-five bushels of oats per acre more than the natural yield of the land, and its natural proportion of roots and straw, I use: Nitrogen, twenty-three pounds; potash, twenty pounds; phosphoric acid, twelve pounds—in the form of sulphate ammonia, twenty-four per cent., one hundred and fifteen pounds; muriate potash, eighty per cent., forty pounds; superphosphate, thirteen per cent. sol. acid, ninety-six pounds.

To produce twenty-five bushels of buckwheat per acre more than the natural yield of the land, and its natural proportion of roots and straw, I use: Nitrogen, thirty-seven pounds; potash, fifty pounds; phosphoric acid, fifteen pounds—in the form of sulphate ammonia, twenty-four per cent., one hundred and eighty-five pounds; muriate potash, eighty per cent., one hundred pounds; superphosphate, thirteen per cent. sol. acid, one hundred and twenty pounds.

To produce twenty-five bushels of barley per acre more than the natural yield of the land, and its natural proportion of roots and straw, I use: Nitrogen, twenty-eight pounds; potash, twenty-five pounds; phosphoric acid, thirteen pounds—in form of sulphate ammonia, twenty-four per cent., one hundred and forty pounds; muriate potash, eighty per cent., fifty pounds; superphosphate, thirteen per cent. sol. acid, one hundred pounds.

To produce twenty bushels of field-beans per acre more than the natural yield of the land, and the natural proportion of roots and straw, I use: Nitrogen, fifty-three pounds; potash, thirty-three pounds; phosphoric acid, twenty pounds—in the form of sulphate ammonia, twenty-four per cent., two hundred and sixty-five pounds; sulphate potash, thirty-five per cent., one hundred and ninety-eight pounds; superphosphate, thirteen per cent. sol. acid, one hundred and sixty pounds.

To produce one hundred bushels of potatoes per acre more than the natural yield of the land, and the natural proportion of tops, I use: Nitrogen, twenty-one pounds; potash, thirty-four pounds; phosphoric acid, eleven pounds—in the form of sulphate ammonia, twenty-four per cent., one hundred and five pounds; sulphate potash, thirty-five per cent., two hundred and four pounds; superphosphate, thirteen per cent. sol. acid, eighty-five pounds.

To produce one hundred bushels of beets per acre more than the natural yield of the land, and the natural proportion of tops, I use: Nitrogen, eleven pounds; potash, twenty-five pounds; phosphoric acid, six pounds—in the form of sulphate ammonia, twenty-four per cent., fifty-five pounds; sulphate potash, thirty-five per cent., one hundred and fifty-five pounds; superphosphate, thirteen per cent. sol. acid, forty-eight pounds.

To produce one hundred bushels of turnips per acre more than the natural yield of the land, and the natural proportion of tops, I use: Nitrogen, eleven pounds; potash, eighteen pounds; phosphoric acid, eight pounds—in the form of sulphate ammonia, twenty-four per cent., fifty-five pounds; sulphate potash, thirty-five per cent., one hundred and eight pounds; superphosphate, thirteen per cent. sol. acid, sixty-four pounds.

To produce one hundred bushels of onions per acre more than the natural yield of the land, and the natural proportion of tops, I use: Nitrogen, thirty pounds; potash, ten pounds; phosphoric acid, nine pounds—in the form of sulphate ammonia, twenty-four per cent., one hundred and fifty pounds; sulphate potash, thirty-five per cent., sixty pounds; superphosphate, thirteen per cent. sol. acid, seventy-two pounds.

To produce one ton of green cabbage on any given area more than natural yield of such area, and its natural proportion of root and stalk, I use: Nitrogen, twenty-eight pounds; potash, twelve pounds; phosphoric acid, four pounds—in form of sulphate ammonia, twenty-four per cent., one hundred and forty pounds; sulphate potash, thirty-five per cent., seventy-two pounds; superphosphate, thirteen per cent. sol. acid, thirty-two pounds.

To produce two tons of dry Indian corn fodder per acre more than the natural yield of the land, and the natural proportion of root, I use: Nitrogen, twenty pounds; potash, sixty-six pounds; phosphoric acid, sixteen pounds—in the form of sulphate ammonia, twenty-four per cent., one hundred pounds; muriate potash, eighty per cent., one hundred and thirty-two pounds; superphosphate, thirteen per cent. sol. acid, one hundred and twenty-eight pounds.

To produce one ton of hay per acre more than the natural yield of the land, I use: Nitrogen, thirty-six pounds; potash, thirty-one pounds; phosphoric acid, twelve pounds—in the form of sulphate ammonia, twenty-four per cent., one hundred and eighty pounds; muriate potash, eighty per cent., sixty-two pounds; superphosphate, thirteen per cent. sol. acid, ninety-six pounds.

To produce one ton of red clover per acre more than the natural yield of the land, I use: Nitrogen, forty-two pounds; potash, forty pounds; phosphoric acid, eleven pounds—in the form of sulphate ammonia, twenty-four per cent., two hundred and ten pounds; sulphate potash, thirty-five per cent., two hundred and forty pounds; superphosphate, thirteen per cent. sol. acid, eighty-eight pounds.

To produce two hundred pounds of cotton lint per acre more than the natural yield of the land, and its natural proportion of root, stem, leaf, bolls, and seed, I use: Nitrogen, thirty-four pounds; potash, thirty-two pounds; phosphoric acid, eighteen pounds; lime, thirty-nine pounds; magnesia, twelve pounds—in the form of sulphate ammonia, twenty-four per cent., one hundred and seventy pounds; sulphate potash, thirty-five per cent., one hundred and ninety-two pounds; superphosphate, thirteen per cent. sol. acid, one hundred and forty-four pounds; sulphate of lime, seventy-nine per cent. sulphate, one hundred and sixteen pounds; sulphate magnesia, sixteen per cent. sulphate, one hundred and twenty-five pounds.

To produce fifteen hundred pounds of tobacco-leaf per acre more than the natural yield of the land, and the natural proportion of root and stalk, I use: Nitrogen, one hundred and nineteen pounds; potash, one hundred and seventy-two pounds; phosphoric acid, sixteen pounds; lime, one hundred and sixty pounds; magnesia, thirty-eight pounds—in the form of sulphate ammonia, twenty-four per cent., five hundred and ninety-five pounds; sulphate potash, thirty-five per cent., one thousand and thirty-two pounds; superphosphate, thirteen per cent. sol. acid, one hundred and twenty-eight pounds; sulphate lime, seventy-nine per cent. sulphate, four hundred and ninety pounds; sulphate magnesia, sixteen per cent. sulphate, four hundred and seventy-five pounds.

To produce other quantities of the foregoing crops, compound the said substances in like proportions.

To obtain the nitrogen I use any compound containing it in the form of a neutral salt, or any substance containing it in known quantity and readily available.

The compounding of these substances is purely mechanical.

My discovery is, that the application to the soil of the above-stated chemical substances in the proportions and in accordance with the principle above specified, will produce crops of sufficient magnitude to contain identically or approximately the quantity of the elements so applied.

What I claim as my invention, and desire to secure by Letters Patent, is—

The process of manufacturing fertilizers, the same consisting in compounding salts containing nitrogen, potash, and phosphoric acid, and these elements, with lime and magnesia, for the cotton and tobacco plant, in the proportions in which they are taken up by the several crops, as shown by an analysis of the plants, and in amounts requisite to produce any desired amount of crops within the limit stated, all substantially as described.

LEVI STOCKBRIDGE.

Witnesses:
  E. A. THOMAS,
  M. R. THOMAS.